No. 625,280. Patented May 16, 1899.
H. V. WALKER.
METHOD OF AND MEANS FOR PRESERVING LIQUIDS.
(Application filed Aug. 20, 1898.)
(No Model.)
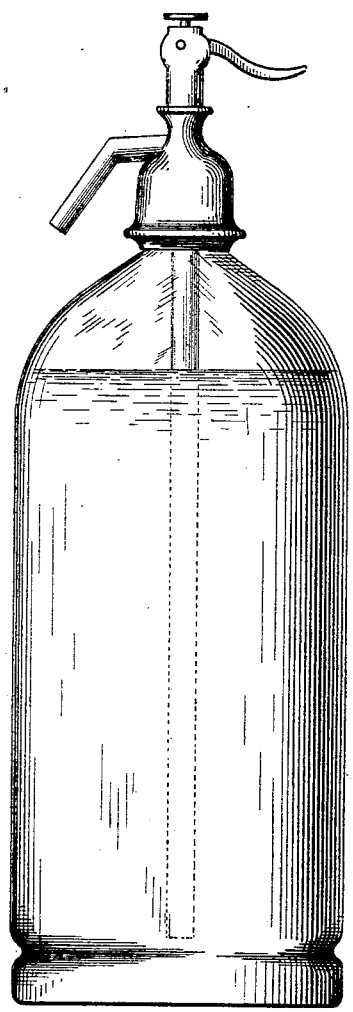
Witnesses
Edward G. Rowland
Nelson Kiss
Henry V. Walker
Inventor
By his Attorney H. Mackay

UNITED STATES PATENT OFFICE.

HENRY V. WALKER, OF NEW YORK, N. Y., ASSIGNOR TO THE WALKER-TAYLOR COMPANY, OF NEW YORK.

METHOD OF AND MEANS FOR PRESERVING LIQUIDS.

SPECIFICATION forming part of Letters Patent No. 625,280, dated May 16, 1899.

Application filed August 20, 1898. Serial No. 689,137. (No model.)

*To all whom it may concern:*

Be it known that I, HENRY V. WALKER, a citizen of the United States, residing in the city of New York, borough of Brooklyn, in the county of Kings and State of New York, have invented a certain new and useful Improvement in Methods of and Means for Preserving and Distributing Liquids, of which the following is a specification.

The main object of my invention is the provision of a method of packing liquid foods and similar materials so as to permit of their preservation for a maximum time without producing chemical changes or adding foreign material in the process of preserving.

My invention is particularly adapted to the preservation and distribution of milk. It is, however, broad enough to cover the peculiar form of packing device hereinafter described as applied to the distribution of any viscous fluid.

One form of package suitable for use in the practice of my invention is shown in the accompanying drawing, representing a side elevation of a siphon-bottle.

In preserving milk, syrups, and other foods intended to be exposed to the air for any considerable time before consumption it has been heretofore customary to treat the same with sugar, salt, salicylic acid, or other substance calculated to retard the growth of germs in the food. It has also been proposed in some instances to alter liquids to be preserved by impregnation with certain gases. On the other hand, sterilizing processes, not involving the addition of foreign substances, do not provide for preservation after once opening the package and are thus productive of inconvenience and waste.

By use of my packing process and of my novel form of package the advantages of sterilizing are combined with those of the preserving processes depending upon the addition of foreign substances. The purity of the food is maintained without addition of foreign solid or gaseous elements, and at the same time the loss due to exposure to the air on opening the package is avoided.

My improved method of packing for sterilizing purposes consists, essentially, in first charging the liquid in an air-tight vessel; second, forcing into said vessel a gas of little or no solubility in said liquid until a suitable pressure is produced—say from fifty to one hundred pounds—and, third, in subjecting the package to a temperature sufficient to destroy fermentation and other germs.

I have found it best to sterilize the gas before leading it into the preserving-package, and this step is an element of my process more specifically considered. By adopting this course means may be taken for the absolute sterilization of the air before its forcing into the vessel, the accomplishment of which by application of heat after forcing in would in most cases be injurious to the liquid to be preserved. Where milk is treated, for instance, I prefer to pasteurize by application of a proper degree of heat less than 212°, as well understood. By use of the term "sterilize" as applied to my claims I intend to cover both the complete destruction of germs and the partial process.

Liquid food and other substances liable to afford support for the propagation of germs are all more or less viscous or tenacious. This is particularly true of syrups and of milk. It is therefore important that the gas to be used should be but slightly, if at all, soluble in the particular liquid to be preserved, since otherwise on releasing the liquid, however slowly, the contained gas would expend and disperse it in froth or bubbles and prevent its being poured. One branch of my invention covers, broadly, the application of my preferred form of package to viscous liquids of all kinds.

Carbonic-acid gas would not be practical for my purpose, as it is very soluble in almost all liquids, and particularly in beverages and foods. Where these are of a viscous nature, attempts at utilization of carbonic acid in siphons have proved futile. The high initial pressure necessary in a siphon, due to the expansion which necessarily takes place before the siphon can be emptied, emphasizes the undesirable characteristics of carbonic acid in this connection. Moreover, its acidity could produce curdling in many liquid foods, and particularly in milk. In the practice of my invention, therefore, I prefer to charge an air-tight vessel having an outlet-valve, such as the siphon illustrated in the drawing, with the liquid to be transported, leaving a certain amount of space at the top, as shown. I then force into this top space such a quantity of air or other slightly-soluble gas as will produce the necessary pressure for gradual discharge of the liquid by proper manipulation of the valve. This gas I preferably sterilize by heat or otherwise before charging where it is important to keep germs out of the contained liquid. Among the more usual and widely-distributed gases suitable as substitutes for air in this connection would be oxygen, nitrogen, and hydrogen. There is in addition to this a large and well-known class of insoluble gaseous hydrocarbons which would answer; but their use would scarcely be commercially practicable. The package thus charged is subjected to a sterilizing temperature and after cooling is ready for distribution.

By the use of a vessel such as shown any desired quantity of liquid may be used without admitting unsterile air to the body of the liquid. Consequently foods may be kept indefinitely, yet always available, without the cost and labor involved in keeping them on ice.

A further advantage in the use of my package lies in the fact that bottles distributed indiscriminately, as in the milk trade, cannot become carriers of germs back to centers of distribution, as often occurs where open bottles are distributed, in which dregs are returned, together with such disease-germs as such dregs have absorbed during the day.

My improved package will be found especially useful in hospitals and other localities wherein precautions against carriage of disease need especial attention.

What I claim is—

1. The process of packing and preserving liquids which afford support for germ propagation which consists in first charging the liquid in an air-tight vessel, then forcing in a gas under pressure which has little or no solubility in said liquid, and lastly subjecting said vessel to a sterilizing temperature.

2. The process of packing and preserving liquids which afford support for germ propagation which consists in first charging the liquid in an air-tight vessel, then forcing in a previously-sterilized gas under pressure said gas having little or no solubility in said liquid, and lastly subjecting said vessel to a sterilizing temperature.

3. The method of preparing perishable viscous liquids for preservation under conditions of gradual use which consists in charging the same together with a practically-insoluble gas under pressure in a closed vessel having a suitable outlet-valve which may be opened and closed without destroying the efficient pressure of said gas, and then sterilizing said liquid in said vessel.

4. As a package admitting of preservation under conditions of gradual use, an air-tight vessel having an outlet-valve, and containing a sterilized liquid affording support for germ propagation and a sterilized gas under a discharging pressure sufficient to allow for the expansion incident to discharge; said gas being practically insoluble in said liquid.

HENRY V. WALKER.

Witnesses:
BENJAMIN A. GOULD,
H. S. MACKAYE.